United States Patent
Ito et al.

(10) Patent No.: US 6,832,382 B2
(45) Date of Patent: Dec. 14, 2004

(54) DISK DEVICE, AND DISK CHANGING METHOD FOR DISK DEVICE

(75) Inventors: Masatoshi Ito, Iwaki (JP); Masami Kojima, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 185 days.

(21) Appl. No.: 10/342,146

(22) Filed: Jan. 14, 2003

(65) Prior Publication Data

US 2003/0169648 A1 Sep. 11, 2003

(30) Foreign Application Priority Data

Jan. 17, 2002 (JP) ........................................ 2002-008668

(51) Int. Cl.[7] .............................................. G11B 17/04
(52) U.S. Cl. ...................................................... 720/619
(58) Field of Search ................................ 720/619, 601, 720/600, 615, 632; 369/75.11, 75.21, 77.11, 77.21, 192.1, 30.85

(56) References Cited

U.S. PATENT DOCUMENTS 6,157,607 A 12/2000 Nakamichi
6,301,205 B1 10/2001 Nakamichi
6,639,880 B2 * 10/2003 Nagasaka et al. ......... 369/30.85
6,781,940 B2 * 8/2004 Nakamichi .................. 720/620

\* cited by examiner

Primary Examiner—Allen Cao
(74) Attorney, Agent, or Firm—Brinks Hofer Gilson & Lione

(57) ABSTRACT

A disk device includes a stock unit with multiple disk holders. When one of the disk holders is selected, the disk holder is moved so as to allow transport of the selected disk to a rotational driving unit. After the selected disk holder has stopped moving, a guide member and a transporting unit are brought closer together to nip a disk held in the disk holder, thereby restricting the disk. A driving unit 50 is then moved to a driving position overlapping the disk which is held in the disk holder, thereby preventing interference between the disk and driving unit. The disk is then transported to the driving unit. Thus, interference between the disk and the rotational driving unit or other structures due to vibrations of the disk within the stock unit can be prevented.

20 Claims, 6 Drawing Sheets

DISK DEVICE, AND DISK CHANGING METHOD FOR DISK DEVICE

BACKGROUND

1. Field of the Invention

The present invention relates to a disk device comprising a stock unit for storing multiple disks and a rotational driving unit, wherein the rotational driving unit is shifted to a position at which the rotational driving unit is overlapped with a disk in the stock unit, and the selected disk is clamped by the rotational driving unit.

2. Description of the Related Art

With a disk-selecting-type disk device (disk changer) for being mounted on a vehicle or the like, disks are stored in multiple stock units, a disk in the stock unit is selected, transferred to a rotational driving unit, then clamped, and is rotationally driven.

In a well-known arrangement of this type of disk-selecting-type disk device, the stock unit is provided within a case along with the rotational driving unit, and operations are conducted such that the rotational driving unit is moved to a position so as to overlap with a disk in the stock unit, thereby enabling reception of the disk from the stock unit following the disk being selected.

In this case, following selection of a disk in the stock unit, the rotational driving unit is first moved to the driving position so as to overlap with the disk in the stock unit, and subsequently, the selected disk is pushed out by the a push-out member provided within the stock unit from the rear end thereof, whereby the disk is sent to the position wherein the disk can be clamped with the rotational driving unit; or, the disk holding unit is withdrawn by a drawing member provided on the rotational driving unit side so that the disk is sent to the position to be clamped with the rotational driving unit.

With this disk device, the rotational driving unit moves to the recording position so as to overlap with the disk within the stock unit and drives the disk at that position. Accordingly, the size of the case can be reduced, and the device can be built into a dashboard of a vehicle.

However, in the configuration wherein a disk in the stock unit is pushed out with a push-out member so as to send the disk to the rotational driving unit, the outer edge of the disk sent to the rotational driving unit side may vertically vibrate while sending the disk, and accordingly the outer edge of the disk may hit structures making up the rotational driving unit or other structures in the case, thereby hindering sending of the disk to the rotational driving unit. Also, the configuration wherein the disk holding unit itself is withdrawn with the drawing member necessitates a complicated configuration of the stock unit.

Further, in an arrangement used for mounting on a vehicle, the portion of the disk stored in the stock unit protruding from the stock unit may vertically vibrate due to the vibrations of the vehicle, resulting in the outer edge of the disk stored in the stock unit hitting other structures within the device, and in a worst-case scenario, the outer edge of the disk may be snared by the other structures. In the event that such a phenomenon occurs, the operations such as selection of a disk in the stock unit, sending of a disk from the stock unit, or the like, cannot be performed, and furthermore, the snared disk cannot be discharged from the case.

BRIEF SUMMARY

The present invention has been made in light of the above problems, and accordingly, it is an object thereof to provide a disk device which can transport a disk within the stock unit to the rotational driving unit without trouble such as the disk hitting or being snared by structures of the rotational driving unit or other structures.

A disk device according to the present invention comprises: a stock unit in which multiple disk holders are arrayed in the direction of the thickness of a disk; a selecting unit for transferring the disk holders in the stacking direction and transferring one of multiple disk holders to a selecting position; a rotational driving unit for clamping a disk; and a transporting unit for transporting a disk between a disk holder at the selecting position and the rotational driving unit, wherein the transporting unit comprises a pair of nipping members for nipping a disk held by a disk holder transferred to the selecting position by the outer edge so as to provide transporting force to the disk; a spacing setting unit for changing spacing between the nipping members which face each other; and a position changing unit for moving the position of the rotational driving unit. The disk device further comprises a control unit for performing operations wherein, prior to performing selecting operations wherein the selecting unit is operated so that a disk holder is transferred, the spacing setting unit is operated so that the nipping members are separated from the outer edge of a disk, and the position changing unit is operated so that the rotational driving unit is moved to a retracted position so as not to overlap with the disk held by the disk holder, and in the event that one of the disk holders moves to the selection position and stops, (1) first, the spacing between the pair of nipping members is decreased so as to nip a disk by the nipping members, (2) following completion of the nipping, the rotational driving unit is moved to a driving position at which the rotational driving unit is overlapped with the disk held by the disk holder, and (3) furthermore, the disk held by the disk holder at the selecting position is transported to a position at which the disk can be clamped by the rotational driving unit by the transporting force of the nipping members.

With the disk device of the present invention, upon the disk holder being transferred to the selecting unit, the rotational driving unit is moved to the driving position at which the rotational driving unit is overlapped with the disk, following nipping of the disk held by this disk holder by nipping members with the outer edge side so that the disk is correctly positioned. Accordingly, the disk at the selecting position can be prevented from vibrating prior to the rotational driving unit moving to the driving position, and thus interference between the disk and the rotational driving unit can be prevented.

Also, following nipping of the disk by the nipping unit, the spacing of the nipping unit may be further decreased, and subsequently increased so that the nipping unit can provide the transporting force, after which the movement described in (2) is performed. According to such a configuration, even in the event that trouble occurs if a portion of a disk stored in the stock unit and protruding therefrom is snared by a structure within the device due to vehicle vibrations or the like, the outer edge of the disk can be forcibly freed from the structure by decreasing the width between the nipping members.

Accordingly, with the present invention, the disk holder holds the disk in a state wherein a portion of the disk protrudes toward the rotational driving unit side, and the operations described in the above-described (1) are useful for an arrangement having a configuration wherein a portion of the disk protruding from the disk holder is nipped at the outer edge thereof by the nipping members.

Moreover, with the present invention, an insertion opening for inserting a disk may be provided in the device, with the rotational driving unit and the stock unit being disposed inside the insertion opening in that order, and the nipping members being disposed so as to move from the insertion opening, pass through the rotational driving unit at the driving position, and reach the stock unit, thus realizing a compact structure for the device.

DETAILED DESCRIPTION OF THE DRAWINGS AND THE PRESENTLY PREFERRED EMBODIMENTS

The present invention will now be described with reference to the drawings.

The disk device 1 can perform playback and recording of various types of disks such as CDs (compact disk), DVDs (digital versatile disk), and the like, each of which are disks of 8 cm in diameter (small disks), or disks of 12 cm in diameter (large disks).

Figure 5:
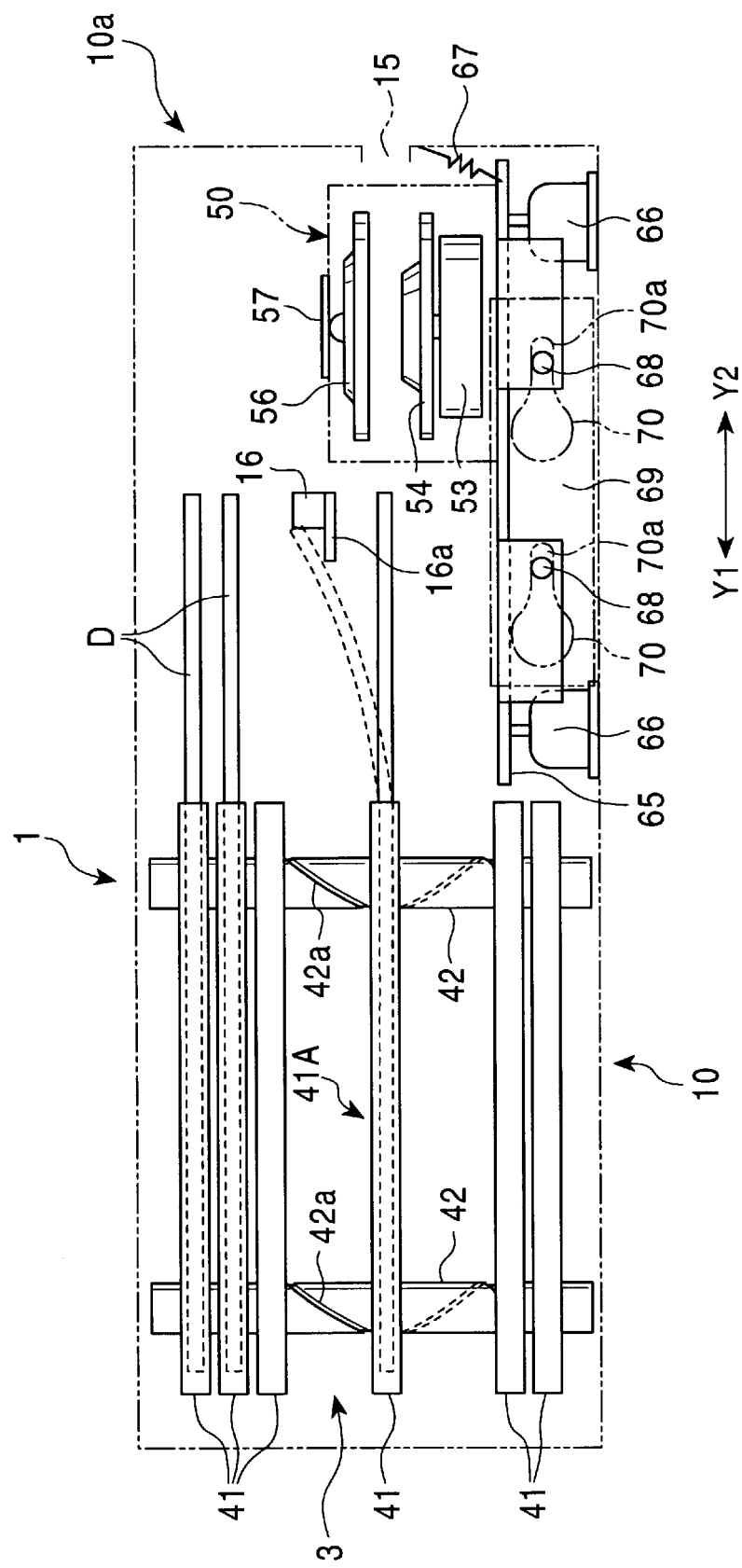
FIG. 5 is a side view which illustrates the internal configuration of the disk device with the driving unit moved to a retracted position.
Figure 6:
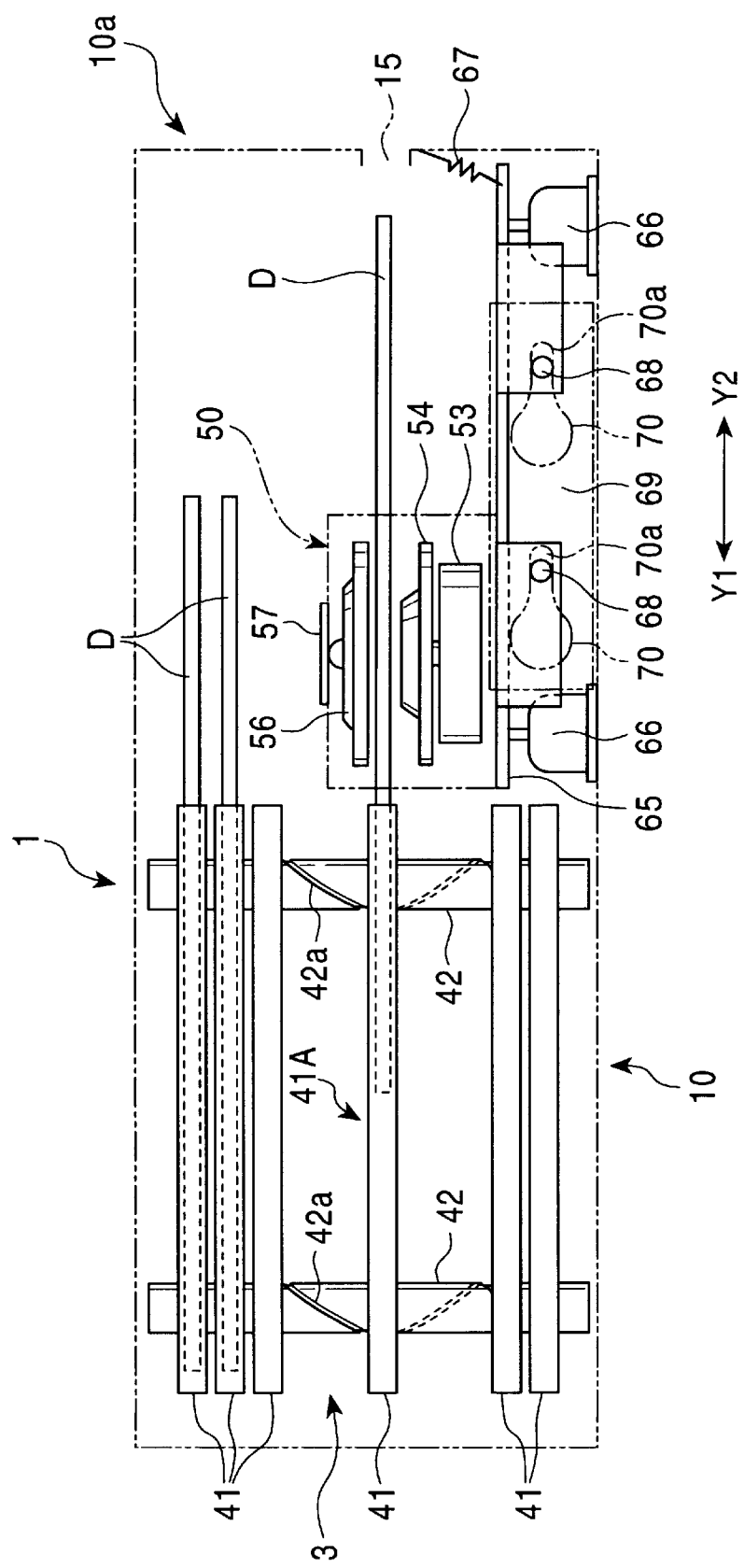
FIG. 6 is a side view which illustrates the internal configuration of the disk device with the driving unit moved to a driving position.

As shown in FIGS. 5 and 6, a face unit 10a is provided at the front of a casing 10 of the main unit of the device, and a slit-shaped insertion opening 15 which extends in the horizontal direction is provided in the face unit 10a. Also, a display unit such as a liquid crystal display panel and operation buttons are provided on the surface of the face unit 10a.

Figure 4:
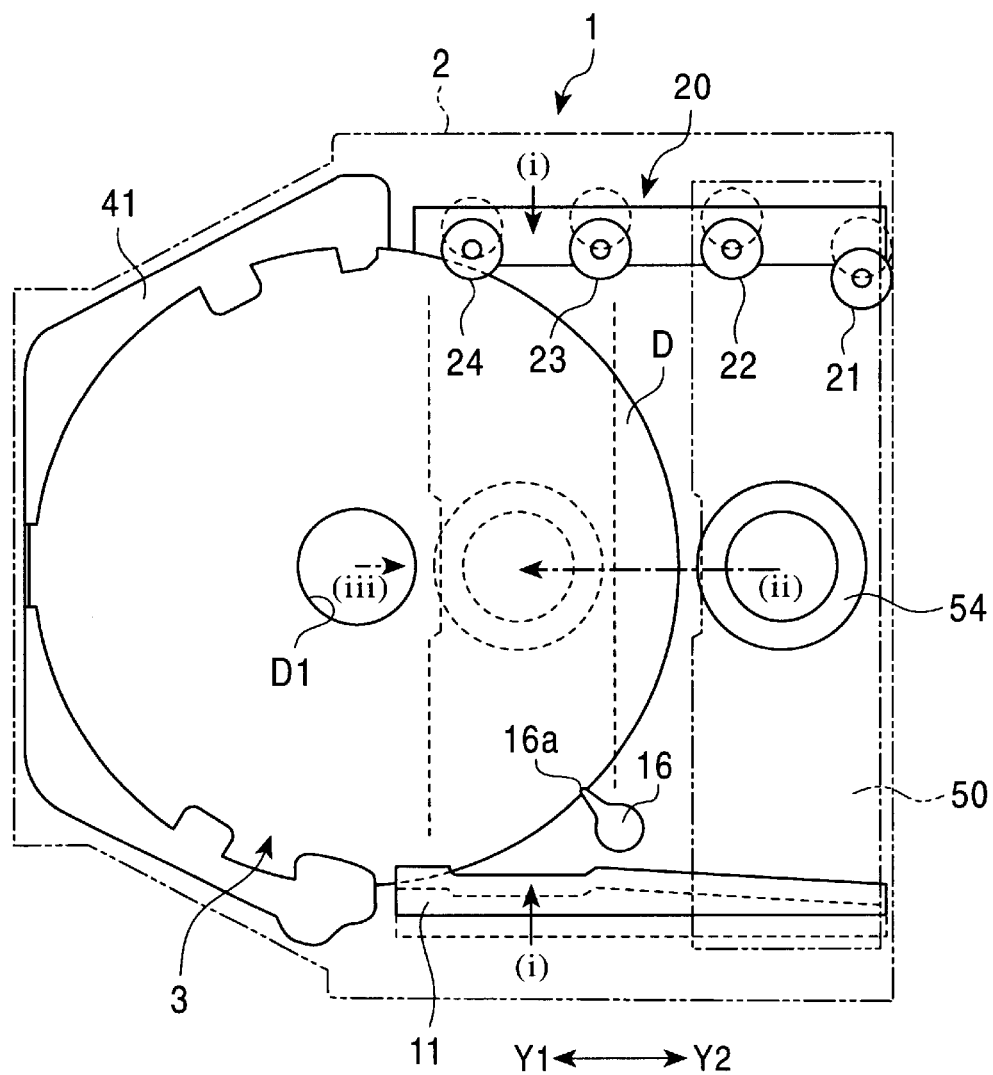
FIG 4 is a plan view which illustrates a process wherein a disk selected in the stock unit is transferred to the rotational driving unit.

A stock unit 3 capable of stacking multiple large disks vertically is provided at the deep side of the Y1 side of the disk device 1, with a large disk being held by each of the disk holders (disk holding units) 41 provided in the stock unit 3, and stacked vertically. As shown in FIG. 4, the disk holder 41 holds the outer edge of the Y1 side of a large disk D of 12 cm in diameter, and a portion of the disk D held by the disk holder 41 protrudes toward the Y2 side from the disk holder 41.

Figure 1:
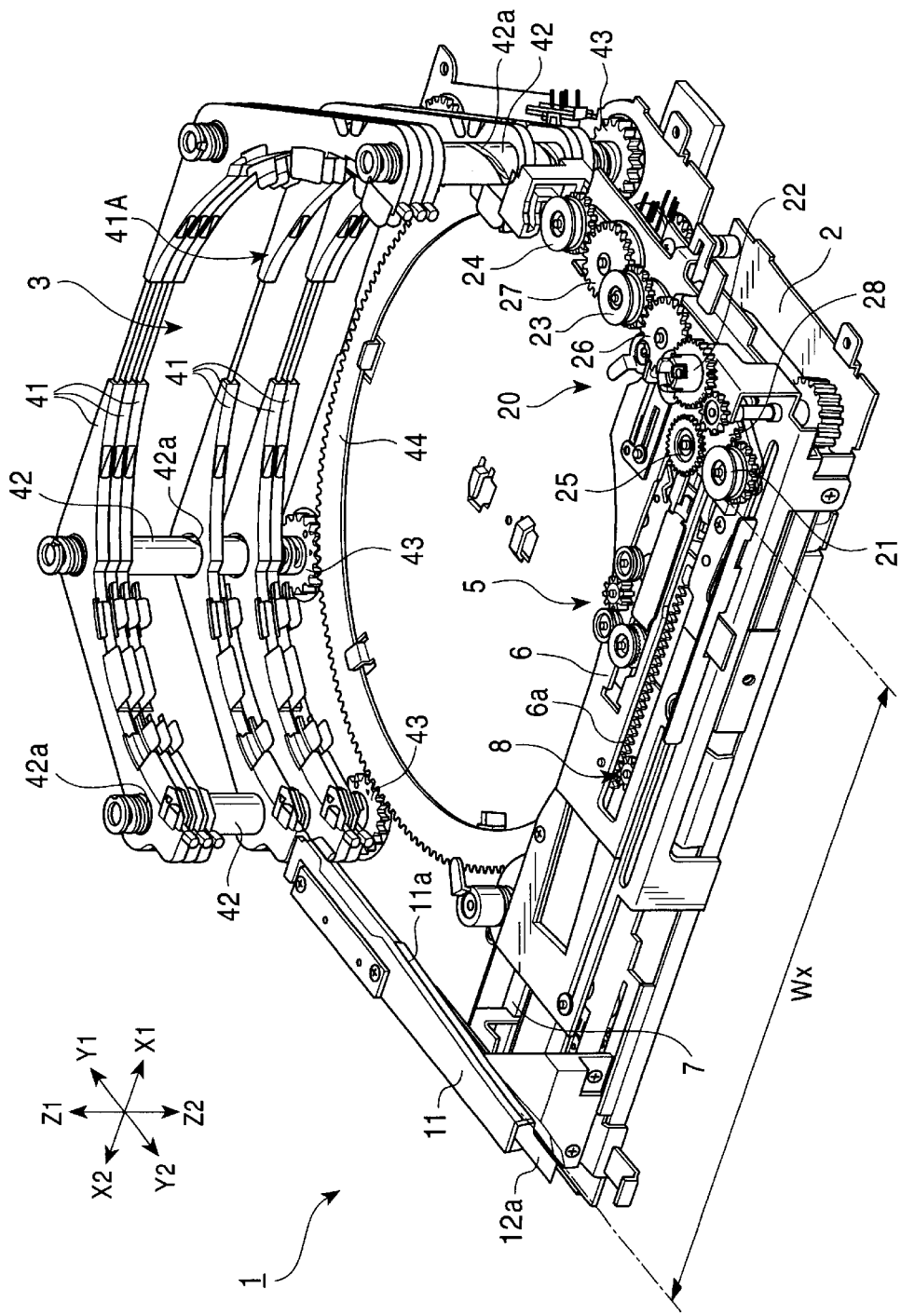
FIG. 1 is a perspective view which illustrates the primary components of a disk device according to the present invention.
Figure 2:
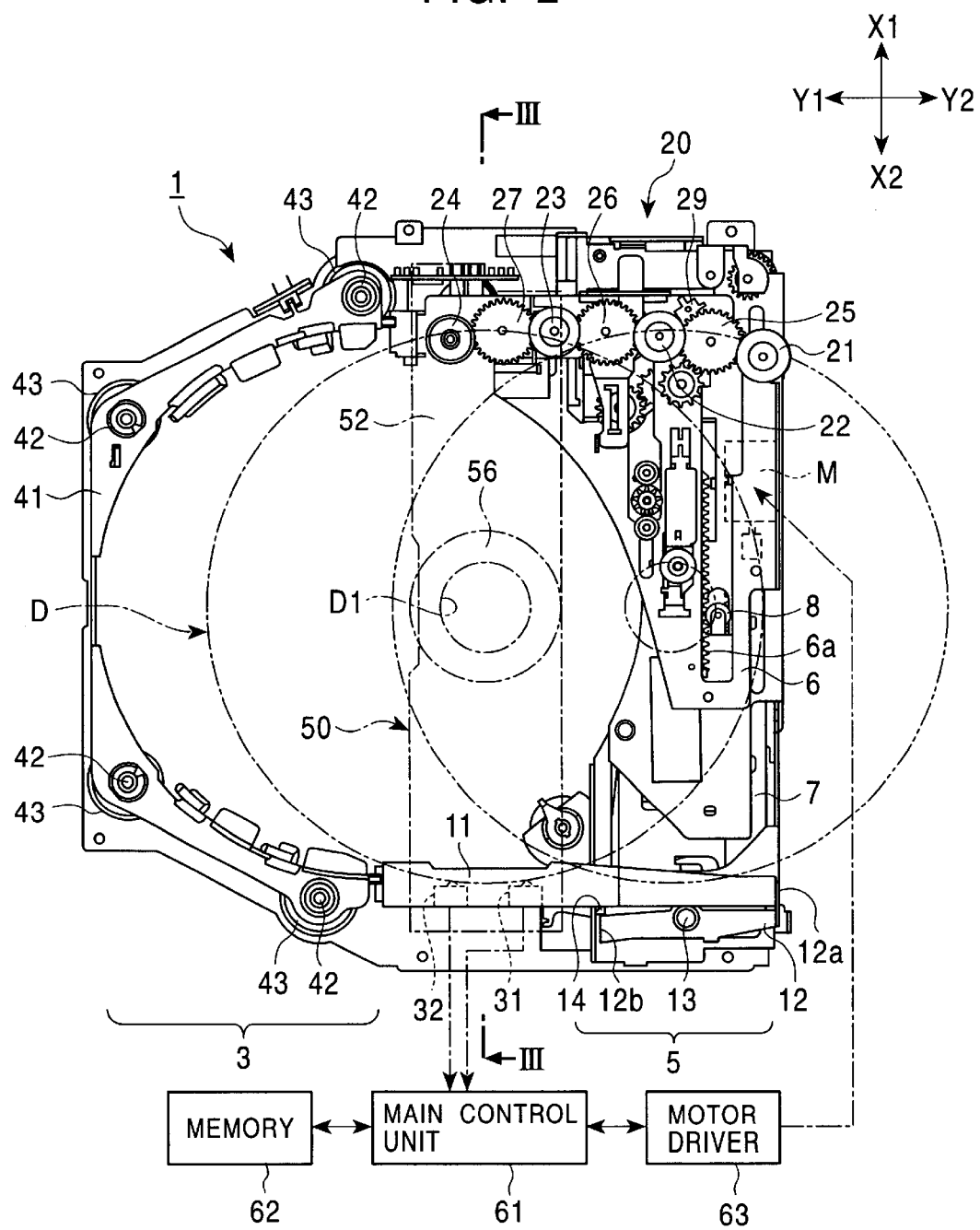
FIG. 2 is a plan view which illustrates a state wherein a large disk is carried into the disk device.

As shown in FIGS. 1 and 2, a disk transporting unit 5 for carrying-in and carrying-out a disk is provided at the position between the insertion opening 15 provided in the face unit and the stock unit 3. The disk transporting unit 5 comprises a first transfer member 6 and a second transfer member 7, provided so as to move in the width direction (X1–X2 direction) on a base 2. A rack 6a is formed on the first transfer member 6, and a rack (not in drawings) facing the rack 6a is also provided on the second transfer member 7. A connection gear 8 which is rotationally driven by a setting motor M shown in FIG. 2 is provided on the base 2 as a spacing setting unit, and the connection gear 8 engages both of the rack 6a of the first transfer member 6 and the rack of the second transfer member 7. In the event that the connection gear 8 is rotated by the setting motor M, the first transfer member 6 and the second transfer member 7 move either in a direction wherein the transfer members approach each other, or in a direction wherein the transfer members are distanced from each other, synchronously.

A guide member 11 serving as a nipping member is provided on one side of the first transfer member 6 and the second transfer member 7, and a transporting unit 20 also serving as a nipping member is provided on the other side thereof. The disk inserted from the insertion opening 15 and the portion of the disk held by the disk holder 41 which protrudes therefrom can be nipped at the outer edge of the disk by a pair of members, namely, the guide member 11 and the transporting unit 20.

Figure 3:
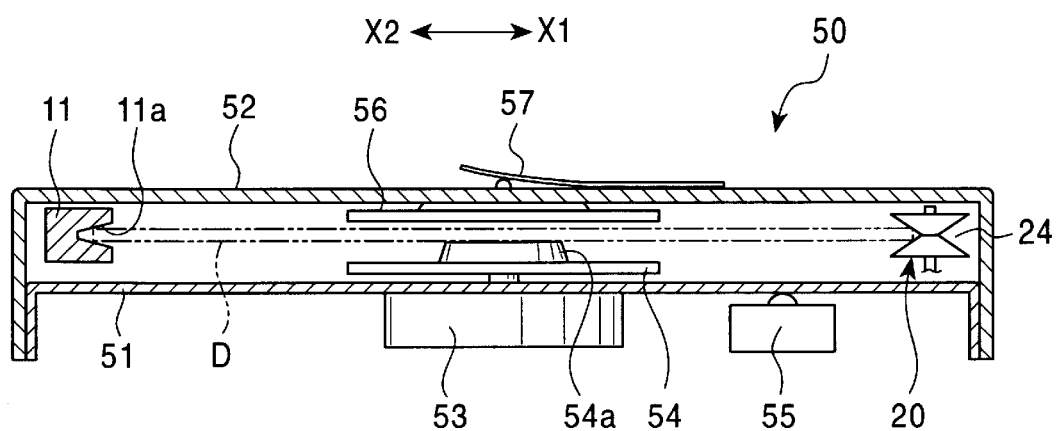
FIG. 3 is a cross-sectional view along line III—III of FIG. 2.

The guide member 11 extends in the direction of Y1–Y2 in the drawing, which is the direction of inserting/discharging a disk. A guide groove 11a for guiding is formed on one side of the guide member 11 (X1 side in the drawing), extending in the Y direction in the drawing. As shown in FIG. 3, the cross-sectional configuration of the guide groove 11a is a V-shaped form wherein the X1 side of the opening is wide and the X2 side thereof is narrow.

A detecting arm (detecting member) 12 is provided at the end of the discharging side (Y2 side) of the guide member 11. The detecting arm 12 is supported so as to rotate clockwise or counterclockwise around a shaft 13 in FIG. 2, and is tensioned in the counterclockwise direction by a tension member not shown in drawings.

A detecting tab 12a protrudes from the detecting arm 12, and is positioned at the end of the discharging side of the guide member 11. When the detecting tab 12a is pressed to the outside (X2 direction) by the outer edge of a disk D which is inserted in the guide groove 11a of the guide member 11, the detecting arm 12 rotates in the clockwise direction.

A pressing tab 12b protrudes in the downward direction in the drawing at the other end of the detecting arm 12, and the pressing tab 12b faces an activator of an insertion detecting switch 14. When the detecting arm 12 is rotated in the clockwise direction, the insertion detecting switch 14 is switched on by the pressing tab 12b.

When the detecting arm 12 is rotated in the counterclockwise direction, and the detecting tab 12a covers the end of the discharging side (Y2 side) of the guide groove 11a of the guide member 11, the pressing tab 12b is separated from the activator of the insertion detecting switch 14, and the insertion detecting switch 14 is switched off.

A transporting unit 20 made up of first through fourth transporting rollers 21, 22, 23, and 24, arrayed in the direction of insertion of the disk D (Y direction), is provided on the first transfer member 6, facing the guide member 11. As shown in FIG. 3, the first through fourth transporting rollers 21, 22, 23, and 24, are each configured as if it were made of two flange with the smaller sides of each flange facing one another, so that the roller has an hourglass-shaped cross-sectional form along the axis thereof, and the outer edge of the disk D is nipped within the V-shaped groove between the flanges.

A transporting motor (not shown in the drawing) is provided in the device, and the driving force of the transporting motor is reduced by reduction gears, and is transmitted through transmission gears 25, 26, 27, and the like, to each of transporting rollers, 21, 22, 23, and 24, and the first through fourth transporting rollers 21, 22, 23, and 24 are all rotationally driven in the same direction. When the first through fourth transporting rollers 21, 22, 23, and 24 rotate clockwise, the disk D is transported to the back side of the device (Y1 direction), and when rotating counterclockwise, the disk D is transported in the other direction (Y2 direction).

As shown in FIG. 1, a rotational arm 28 which can rotate in a predetermined angular range with the supporting shaft as a fulcrum is provided on the first transfer member 6, and the first transporting roller 21 is supported by the end of the rotational arm 28. Also, the rotational arm 28 is tensioned in the clockwise direction at all times by a tension member such as a pulling coil spring or the like. An insertion detecting switch 29 (see FIG. 2), which is switched on when the rotational arm 28 is rotated by a predetermined angle in the counterclockwise direction, is provided on the first transfer member 6.

A linear position sensor (not shown) for detecting the shifting position in the X direction of the second transfer member 7 is provided on the base 2. The linear position sensor is a linear variable resistor, for example, and can detect the position of the second transfer member 7, thereby enabling detection of the spacing Wx between the guide member 11 and the transporting unit 20 facing each other, by the resistance value which varies linearly.

As shown in FIG. 2, a first detecting switch 31 and a second detecting switch 32 are provided on the guide member 11. Each activator of the first detecting switch 31 and the second detecting switch 32 are situated along and within the guide groove 11a of the guide member 11. In the event that the activators are pressed by the edge of the moving disk in the guide groove 11a, the first detecting switch 31 and the second detecting switch 32 are turned on.

Multiple guide supports 42 are rotationally disposed vertically on the base 2 in the stock unit 3. A small gear 43 is integrally formed at each base end of the guide supports 42, and a large ring-shaped gear 44 which meshes with all of the small gears 43 is provided on the base 2. All the guide supports 42 are rotationally driven synchronously by a selecting motor, not shown in the drawing, driving the ring-shaped gear 44.

A screw groove 42a is formed in the outer circumference of each of the guide supports 42. The screw groove 42a has a configuration wherein the pitch thereof is small in the top and bottom portion, and the pitch thereof is large in the middle position. A protrusion which engages the screw groove 42a of the guide support 42 is provided on the disk holder 41. In the event that the guide support 42 rotates, each disk holder 41 is moved vertically by the screw groove 42a.

As described above, the disk holders 41 are stacked so as to overlap each other in high density at the top portion and the bottom portion, due to the screw groove 42a having the high density of the pitch at the top portion and the bottom portion of the guide supports 42. Also, a disk holder 41 can move vertically away from the adjacent disk holders at the middle portion of the guide support 42, due to the low density of the pitch of the screw grooves 42a at the middle portion of the guide supports 42. One of the disk holders 41 is selected by moving the disk holders 41 in the vertical direction; the selected disk holder 41 is transferred to the selection position 41A at the same height as the guide member 11 and the transporting unit 20 as shown in FIG. 1; and is stopped.

The present embodiment comprises a selecting unit for selecting a disk holder 41 formed by the guide supports 42, the small gears 43, and the ring-shaped gear 44.

A driving unit 50 is provided on the base 2. As shown in FIG. 3, the driving unit 50 includes a drive chassis 51 and a clamp chassis 52, which are assembled in a parallel manner. The drive chassis 51 is positioned beneath the transport path for the disk D defined by the guide member 11 and the transporting unit 20, and the clamp chassis 52 is positioned above the transport path.

A spindle motor 53 is provided below the drive chassis 51, and a turntable 54 which is rotationally driven by the spindle motor 53 is provided thereabove. In this configuration, the turntable 54 is a rotational driving unit. Also, an optical head 55 is provided below the drive chassis 51. The optical head 55 faces the disk D clamped by the turntable 54 through a notch formed in the drive chassis 51. Also, the optical head 55 is moved on the drive chassis 51 over the recording face of the disk D.

A clamper 56 is rotationally supported by the clamp chassis 52, and the clamper 56 is tensioned in the downward direction by a flat spring 57.

The drive chassis 51 is provided with a switching force from the clamp driving unit, and the drive chassis 51 is driven vertically either in the direction wherein the drive chassis 51 and the clamp chassis 52 approach each other, or in the direction wherein the drive chassis 51 and the clamp chassis 52 move away from each other by the clamp driving unit. When the drive chassis 51 is moved downward, an opening for transferring the disk D is formed between the turntable 54 and the clamper 56. When the drive chassis 51 is raised, the turntable 54 and the clamper 56 approach each other, and at that time, the clamper 56 is pressed into contact against the turntable 54 with the disk placed therebetween, by the force of the flat spring 57.

As shown in FIGS. 5 and 6, a supporting chassis 65 for supporting the driving unit 50 is provided within the casing 10. The driving unit 50 is supported for movement in the Y1–Y2 direction on the top side of the supporting chassis 65. The driving unit 50 can be moved in the Y1–Y2 direction over the supporting chassis 65 by the driving force of a motor making up a position-changing unit (not shown in the drawings).

FIG. 6 illustrates the state wherein the driving unit 50 is transferred to the driving position. The disk D is clamped by the driving unit 50 which stops at the driving position shown in FIG. 6, and is rotationally driven. When the operation of selecting one of the disks is performed by vertically moving the disk holders 41 in the stock unit 3, the driving unit 50 is transferred to the retracted position toward the insertion opening 15 side (Y2 side) as shown in FIG. 5, so as not to contact the disk D ascending or descending along with the disk holder 41.

The supporting chassis 65 is supported by clampers 66 and is hung by a coil spring 67 within the casing 10. Pins 68 are fixed on the side of the supporting chassis 65. A lock member 69 which can move in the Y1–Y2 direction is provided at the casing 10 side, and the pins 68 are inserted into lock openings 70 formed on the lock member 69. Each lock opening 70 has a lock unit 70a wherein the width thereof is narrow at the Y2 side.

In FIGS. 5 and 6, the lock member 69 is transferred in the Y1 direction, and the pins 68 are held within the lock units 70a, whereby the supporting chassis 65 is locked. When the disk D is clamped by the turntable 54 and the clamper 65, the lock member 69 is transferred in the Y2 direction, and the lock units 70a of the lock openings 70 are separated from the pins 68, whereby the supporting chassis 65 is unlocked. At that time, the supporting chassis 65 and the driving unit 50 are set to a state wherein the members are elastically supported within the casing 10 by the clampers 66 and the coil spring 67.

While the setting motor M, for moving the first transfer member 6 and the second transfer member 7 to set the spacing Wx therebetween, is driven by a motor driver 63, the motor driver 63 is controlled by a main control unit 61. Other motors in the device are also controlled by the main control unit 61.

The detecting output from the linear position sensor for detecting the shifting position of the second transfer member 7 also is supplied to the main control unit 61. The detection outputs from the first detecting switch 31 and the second detecting switch 32, provided on the guide member 11, also are supplied to the main control unit 61.

Next, the operation of the disk device will be described.

The home position wherein the disk device stops operation is that wherein the driving unit 50 is at the driving position shown in FIG. 6, with the first transfer member 6 shifting in the X1 direction and the second transfer member 7 shifting in the X2 direction, so as to set the spacing Wx between the pair of members facing each other and making up a nipping member to a larger size than a large disk of 12 cm in diameter.

When inserting a disk, an operating button provided on the face unit 10a is pressed. The first transfer member 6 and the second transfer member 7 approach each other, and the spacing Wx between the guide member 11 and the transporting unit 20 is set smaller than the diameter of a small disk (8 cm). Each of the transporting rollers 21, 22, 23, and 24, of the transporting unit 20 rotate in the direction wherein a disk can be carried in.

When a disk is inserted from the insertion opening 15, and the outer edge thereof presses either of the detecting arm 12 or the rotational arm 28 outward, and either of the insertion detecting switches 14 or 29 turns on, the judgment is made that a disk has been inserted, and the setting motor M is driven. The first transfer member 6 and the second transfer member 7 begin to move in the direction wherein the first transfer member 6 and the second transfer member 7 move away from each other. At this time, the spacing Wx between the guide member 11 and the transporting member 20 is increased to the size wherein a small disk of 8 cm in diameter can be nipped so as to be transported. Setting of the spacing Wx is controlled by the linear position sensor detecting the shift position of the second transfer member 7.

The spacing Wx which is set at this time is for a small disk of 8 cm in diameter, since only one or the other of the detecting arm 12 and the rotational arm 28 is pressed so as to move outward, and accordingly one or the other of two insertion detecting switches 14 and 29 turns on, but both of those are not turned on simultaneously by the small disk. Therefore, if the judgment is made that both of the insertion detecting switches 14 and 29 do not turn on simultaneously, and only one or the other of the insertion detecting switches turns on, the spacing Wx is set to the size wherein a small disk of 8 cm in diameter can be nipped, and the small disk is carried into the device by the transporting unit 20.

If a large disk of 12 cm in diameter is inserted from the insertion opening 15, the detecting arm 12 and the rotational arm 28 are pressed so as to move outward simultaneously by the outer edge of the disk immediately following the disk being carried in by the transporting rollers of the transporting unit 20, and accordingly, both of the two insertion detecting switches 14 and 29 turn on simultaneously. At this time, the spacing between the first transfer member 6 and the second transfer member 7 is increased while monitoring the linear position sensor, so as to set the spacing Wx to the size wherein a large disk can be nipped. The large disk D is then carried into the device.

At the point that the small disk or the large disk inserted from the insertion opening 15 is transported toward the driving unit 50, upon the first detecting switch 31 provided on the guide member 11 turning on, the drive chassis 51 is raised within the driving unit 50. The center opening D1 of the small disk or the large disk receives a transporting force from the transporting unit 20 and is fit to a position setting protrusion unit 54a of the turntable 54, and further the clamper 56 is pressed into contact against the disk by the force of flat spring 57, whereby clamping of the disk is completed. Upon clamping of the disk being completed, both of the first detecting switch 31 and the second detecting switch 32 turn on, and the judgment is made that the disk is correctly clamped on the turntable 54 by confirmation thereof.

Upon recognizing completion of the clamping of the disk, the guide member 11 and the transporting unit 20 are set to the positions so that the spacing Wx therebetween is the widest, and the guide member 11 and the transporting unit 20 are moved away from the edge of the small disk or the large disk. The locking state by the lock member 69 shown in FIGS. 5 and 6 is then unlocked, so the supporting chassis 65 is elastically supported. The disk is then rotationally driven so as to perform recording or playback using the optical head 55.

Following completion of playback or recording, if the disk clamped by the turntable 54 is a small disk, the small disk is not transported to the stock unit 3 and awaits the action of an "eject" button on the face unit. If the "eject" button is pressed, the spacing Wx between the guide member 11 and the transporting unit 20 is decreased so as to nip the small disk with the guide member 11 and the transporting unit 20. The clamping for the disk is then unlocked, each transporting roller of the transporting unit 20 rotates, and the small disk is carried out in the Y2 direction as if the disk were rolling along the guide member 11 receiving the transporting force from the transporting unit 20.

If the disk clamped by the turntable 54 is a large disk, the operation of transporting the disk to the stock unit 3 is performed immediately following the operation of playback or recording. First, the setting motor M runs so that the first transfer member 6 and the second transfer member 7 approach each other, and the spacing Wx between the guide member 11 and the transporting unit 20 is decreased, whereby the large disk D is nipped by the guide member 11 and the transporting unit 20. The drive chassis 51 of the driving unit 50 is lowered so as to unlock the clamping of the disk by the turntable 54 and the clamper 56. Moreover, the transporting unit 20 begins to move in the direction of carrying-in, and the disk is sent toward the disk holder 41 at the selecting position 41A at the same height as the guide member 11 and the transporting unit 20, whereby the disk is held by the disk holder 41.

Subsequently, the first transfer member 6 and the second transfer member 7 are operated so as to be moved away from each other, and accordingly the spacing Wx between the guide member 11 and the transporting unit 20 is increased, whereby the guide member 11 and the transporting unit 20 move to a position where they do not contact the disk held by the disk holder 41.

If a user desires to select and drive a large disk stored in the stock unit 3, the user presses one of operation buttons provided on the face unit 10a so as to instruct the number of the disk holder.

Upon this operation being made, the driving unit 50 moves to the insertion opening 15 side as shown in FIGS. 4 and 6 so as to retract and not contact the large disk held by the disk holder 41. The selecting unit is then driven so that the disk holders 41 are moved vertically, and the designated disk holder is transferred to the selecting position 41A. The disk holder 41 at the selecting position 41A stops at the same height as the guide member 11 and the transporting unit 20.

First, as indicated by (i) shown in FIG. 4, the spacing Wx between the guide member 11 and the transporting unit 20, forming a nipping unit, is decreased, whereby the protrusion of the disk D toward the Y2 direction, held by the disk holder 41, is nipped by the guide member 11 and the fourth transporting roller 24 which is situated at the deep side of the transporting unit 20.

As shown in FIG. 3, since the outer edge of the disk D is nipped by the V-shaped guide groove 11a of the guide member 11 and the V-shaped profile of the transporting roller 24, the disk D protruding from the disk holder 41 is restricted in the direction of the thickness thereof. After performing the nipping, the driving unit 50, which has been retracted, is moved in the Y1 direction as indicated by (ii) in FIG. 4, so as to be situated at the driving position. At this time, while the turntable 54 of the driving unit 50 moves below the disk D held by the disk holder 41 and the clamper 56 moves above the disk D, the disk D is nipped by the guide member 11 and the transporting roller 24 so as to be restricted, thereby preventing the turntable 54 or the clamper 56, moving in the Y1 direction, from hitting against the outer edge of the disk D held by the disk holder 41. Accordingly, the driving unit 50 can reliably be moved to the driving position shown in FIG. 6.

Note that confirmation of whether or not the guide member 11 and the transporting roller 24 have approached each other to the positions at which the disk D is nipped, can be made by the linear position sensor monitoring the shifting position of the second transfer member 7. Accordingly, the main control unit 61 stops the motor M at the position wherein the disk is nipped by the guide member 11 and the transporting unit 24, thereby stopping the operation wherein the first transfer member 6 and the second transfer member 7 approach each other.

Furthermore, with an even more preferable embodiment, upon the guide member 11 and the transporting roller 24 being situated at the positions at which a large disk of 12 cm in diameter held by the disk holder 41 can be nipped, the first transfer member 6 and the second transfer member 7 are moved further in the direction to approach each other, whereby the spacing between the guide member 11 and the transporting roller 24, is decreased from the size for transporting the large disk. At that time, the disk is reliably held with the outer edge thereof within the V-shaped guide groove 11a of the guide member 11 and the V-shaped groove of the transporting roller 24.

Accordingly, in the event that the disk protruding from the disk holder 41 is snared by any structure in the device, the holding action by the V-shaped portions of the guide member 11 and the transporting roller 24 enables the disk to be freed.

FIGS. 4 and 5 illustrate a case wherein a suppressing member 16 for disks above the selected disk is employed as an example of a configuration wherein the outer edge of the disk D held by the disk holder 41 at the selecting position 41A may be snared. The suppressing member 16 is provided so that disks held by the disk holders 41 just above the disk holder 41 at the selecting position 41A do not contact the driving unit 50.

A tab 16a is provided on the suppressing member 16, and the suppressing member 16 can be rotated so as to move to a position wherein the tab 16a is overlapped with the disks in the stock unit 3, or to a position wherein the tab 16a is distanced from the disks. Upon completion of the selecting operation of the disk holder 41, the suppressing member 16 is rotated so that the tab 16a separates the disk held by the disk holder 41 at the selecting position 41A from the disks held by the other disk holders 41.

While FIG. 5 illustrates a configuration wherein the spacing between the disk holder 41 stopped at the selecting position 41A and the disk holder 41 at the next higher position is relatively wide, if the casing 10 of the disk device is a small type such as 1DIN, for example, the spacing between the disk holder 41 stopped at the selecting position 41A and the disk holder 41 at the position above the selecting position is very narrow. Accordingly, the disk held by the disk holder 41 at the upper position may hit the driving unit 50 if the suppressing member 16 is not provided.

Also, in the case of a small device as described above, the suppressing member 16 is positioned close to the disk D held by the disk holder 41 at the selecting position 41A, and accordingly, the disk D may be snared by the tab 16a in the event that the disk held by the disk holder 41 at the selecting position 41A vibrates vertically due to vehicle vibrations, as indicated by broken lines in FIG. 5.

Even if such a phenomenon occurs, the height of the portion of the disk protruding from the disk holder 41 can be adjusted by performing an operation to reduce the width between the guide member 11 and the transporting unit 20, as described above, and forcibly holding the disk with the V-shaped portions, thereby freeing the outer edge of the disk D from the tab 16a. Accordingly, trouble wherein subsequent operations cannot be performed due to snaring the tab 16a with a disk can be prevented.

As described above, the transporting rollers 21, 22, 23, and 24 rotate in the counterclockwise direction following the disk being nipped by the guide member 11 and the transporting roller 24, and the driving unit 50 being shifted to the driving position. As indicated by (iii) shown in FIG. 4, the disk is drawn in the Y2 direction from the disk holder 41, and the disk is clamped within the driving unit 50. The spacing between the guide member 11 and the transporting unit 20 is then increased so as to separate from the outer edge of the disk, and subsequently, the disk is rotationally driven to perform a recording or a playback operation.

After playback or recording of the disk has ended, the disk is nipped by the guide member 11 and the transporting unit 20, and subsequently, the clamping by the turntable 54 and the clamper 56 is disengaged, and the disk is stored in the disk holder 41, or is discharged toward the insertion opening 15.

What is claimed is:

1. A disk device comprising:
   a stock unit in which multiple disk holders are arrayed in the direction of the thickness of a disk;
   a selecting unit for transferring said disk holders in said direction and transferring one of the disk holders to a selecting position;
   a rotational driving unit for clamping a disk; and
   a transporting unit for transporting a disk between a disk holder at the selecting position and said rotational driving unit, wherein said transporting unit comprises
- a pair of nipping members for nipping a disk held by a disk holder transferred to the selecting position by the outer edge of the disk so as to provide a transporting force to said disk,
- a spacing setting unit for changing the spacing between said nipping members, and
- a position changing unit for moving the position of said rotational driving unit;

further comprising a control unit for performing operations wherein, prior to said selecting unit being operated so that a disk holder is transferred, said spacing setting unit is operated so that said nipping members are separated from the outer edge of a disk, and said position changing unit is operated so that said rotational driving unit is moved to a retracted position so as not to overlap with said disk held by said disk holder, and when one of said disk holders moves to said selection position and stops, (1) the spacing between said pair of nipping members is decreased so as to nip said disk,
(2) following completion of the nipping, said rotational driving unit is moved to a driving position at which said rotational driving unit is overlapped with said disk held by said disk holder, and
(3) said disk held by said disk holder at said selecting position is transported to a position at which said disk is clamped by said rotational driving unit by the transporting force of said nipping members.

2. A disk device according to claim 1, wherein, in said operation (1), following nipping a disk by said nipping members, the spacing between said nipping members is further decreased, and subsequently said spacing is increased so that said nipping members provide transporting force to said disk, after which the moving of said rotational driving unit described in said operation (2) is performed.

3. A disk device according to claim 1, wherein said disk holder holds said disk so that a portion of the disk protrudes toward the rotational driving unit side;
and wherein in said operation (1), a portion of the disk protruding from said disk holder is nipped at the outer edge thereof by said nipping members.

4. A disk device according to claim 2, wherein said disk holder holds said disk so that a portion of the disk protrudes toward the rotational driving unit side;
and wherein in said operation (1), a portion of the disk protruding from said disk holder is nipped at the outer edge thereof by said nipping members.

5. A disk device according to claim 1, wherein an insertion opening for inserting a disk is provided in the device; said rotational driving unit and said stock unit are disposed inside the device beyond said insertion opening in that order; and said nipping members are disposed so as to extend from said insertion opening, through the rotational driving unit at the driving position, and reach said stock unit.

6. A disk device according to claim 2, wherein an insertion opening for inserting a disk is provided in the device; said rotational driving unit and said stock unit are disposed inside the device beyond said insertion opening in that order; and said nipping members are disposed so as to extend from said insertion opening, through the rotational driving unit at the driving position, and reach said stock unit.

7. A disk device according to claim 3, wherein an insertion opening for inserting a disk is provided in the device; said rotational driving unit and said stock unit are disposed inside the device beyond said insertion opening in that order; and said nipping members are disposed so as to extend from said insertion opening, through the rotational driving unit at the driving position, and reach said stock unit.

8. A disk device according to claim 4, wherein an insertion opening for inserting a disk is provided in the device; said rotational driving unit and said stock unit are disposed inside the device beyond said insertion opening in that order; and said nipping members are disposed so as to extend from said insertion opening, through the rotational driving unit at the driving position, and reach said stock unit.

9. A disk device according to claim 1, wherein one of said nipping members comprises one or more transporting rollers for providing transporting force to the outer edge of a disk, and the other of said nipping members comprises a guide member for guiding a disk at said driving position to said disk holder at said selection position, or for guiding a disk in said disk holder at said selection position to said driving position.

10. A disk device according to claim 2, wherein one of said nipping members comprises one or more transporting rollers for providing transporting force to the outer edge of a disk, and the other of said nipping members comprises a guide member for guiding a disk at said driving position to said disk holder at said selection position, or for guiding a disk in said disk holder at said selection position to said driving position.

11. A disk device according to claim 3, wherein one of said nipping members comprises one or more transporting rollers for providing transporting force to the outer edge of a disk, and the other of said nipping members comprises a guide member for guiding a disk at said driving position to said disk holder at said selection position, or for guiding a disk in said disk holder at said selection position to said driving position.

12. A disk device according to claim 4, wherein one of said nipping members comprises one or more transporting rollers for providing transporting force to the outer edge of a disk, and the other of said nipping members comprises a guide member for guiding a disk at said driving position to said disk holder at said selection position, or for guiding a disk in said disk holder at said selection position to said driving position.

13. A disk device according to claim 1, wherein said disk holder holds a large disk of 12 cm in diameter.

14. A disk device according to claim 2, wherein said disk holder holds a large disk of 12 cm in diameter.

15. A disk device according to claim 3, wherein said disk holder holds a large disk of 12 cm in diameter.

16. A disk device according to claim 4, wherein said disk holder holds a large disk of 12 cm in diameter.

17. A disk device according to claim 1, wherein said nipping members comprise a detecting unit for detecting that a disk has been transferred to a position at which said disk is clamped by said rotational driving unit.

18. A disk device according to claim 2, wherein said nipping members comprise a detecting unit for detecting that a disk has been transferred to a position at which said disk is clamped by said rotational driving unit.

19. A disk changing method for a disk device comprising a stock unit in which multiple disk holders are arrayed in the direction of the thickness of a disk; a selecting unit for transferring said disk holders in said direction and transferring one of the disk holders to a selecting position; a rotational driving unit for clamping a disk; and a transporting unit for nipping the outer edge of a disk by a pair of nipping members so as to transport the disk between a disk holder at said selecting position and said rotational driving unit, said method comprising:

prior to performing a selecting operation by said selection unit, the spacing between said nipping members is set so that said nipping members are separated from the outer edge of the disk and said rotational driving unit is moved to a retracted position so as not to overlap with the disk held by said disk holder, and after one of said disk holders moves to said selecting position and stops, first said nipping members nip a disk by decreasing the spacing between said pair of nipping members, and following completion of this nipping, said rotational driving unit is moved to the driving position at which said rotational driving unit overlaps with the disk held by the disk holder and the disk held by the disk holder at the selecting position is transported by said nipping members to a position at which said rotational driving unit clamps the disk.

20. A disk changing method for a disk device comprising a stock unit in which multiple disk holders are arrayed in the direction of the thickness of a disk; a selecting unit for transferring said disk holders in said direction and transferring one of the disk holders to a selecting position; a rotational driving unit for clamping a disk; and a transporting unit for nipping the outer edge of a disk by a pair of nipping members so as to transport the disk between a disk holder at said selecting position and said rotational driving unit, said method comprising:

prior to performing a selecting operation by said selection unit, the spacing between said nipping members is set so that said nipping members are separated from the outer edge of the disk and said rotational driving unit is moved to a retracted position so as not to overlap with the disk held by said disk holder; and when one of said disk holders moves to said selecting position, after said nipping members nip the disk by decreasing the spacing between said pair of nipping members, the spacing between said nipping members is further decreased; subsequently, said spacing is increased so that said nipping members can provide a transporting force to said disk, after which said rotational driving unit is moved to the driving position at which said rotational driving unit overlaps with the disk held by the disk holder; and the disk held by the disk holder at the selecting position is transferred by the transporting force of said nipping members to the position at which said rotational driving unit clamps the disk.

* * * * *